United States Patent [19]

Trixl

[11] 4,080,768
[45] Mar. 28, 1978

[54] CONNECTING ARRANGEMENT

[75] Inventor: Georg Trixl, Zurich, Switzerland

[73] Assignee: Consecco A.G., Glarus, Switzerland

[21] Appl. No.: 754,792

[22] Filed: Dec. 27, 1976

[30] Foreign Application Priority Data

Apr. 21, 1976 Switzerland .......................... 4969/76

[51] Int. Cl.² ............................................... E04D 1/00
[52] U.S. Cl. ................................. 52/521; 52/582;
29/464; 29/526 R; 403/388; 403/393; 403/373
[58] Field of Search .............. 403/388, 373, 285, 364,
403/380, 97, 92, 393; 52/521, 584, 622, 582;
29/521, 526, 464, 155 R

[56] References Cited

U.S. PATENT DOCUMENTS

| | | | |
|---|---|---|---|
| 2,587,522 | 2/1952 | Pilkington | 403/285 X |
| 2,920,682 | 1/1960 | Lindberg | 29/464 UX |
| 2,924,312 | 2/1960 | Williams | 29/521 UX |
| 2,975,312 | 3/1961 | Ploran | 29/521 X |
| 3,000,093 | 9/1961 | Wredenfors | 29/521 X |
| 3,131,471 | 5/1964 | Nieter | 29/521 |
| 3,138,963 | 6/1964 | Prince | 29/464 UX |
| 3,305,995 | 2/1967 | Armstrong et al. | 29/526 X |
| 3,333,319 | 8/1967 | Taylor | 29/521 X |
| 3,495,857 | 2/1970 | Hawke et al. | 403/97 X |
| 3,531,850 | 10/1970 | Durand | 29/526 X |

*Primary Examiner*—Wayne L. Shedd
*Attorney, Agent, or Firm*—Saul Jecies

[57] ABSTRACT

A first and a second element have respective abutting surfaces which together form an interface. One or more connecting members, such as screws, rivets or the like, connect the elements together. The juxtaposed sides of the elements are formed with respective matingly interengaging projections and recesses which resist forces that are being transmitted between the elements and act in the plane of the interface. The invention is especially advantageous for use in erecting trusses or arches of halls and other buildings, and in such a case the elements may be structural plates having the recesses and projections grouped about the locations of the respective connecting members.

25 Claims, 4 Drawing Figures

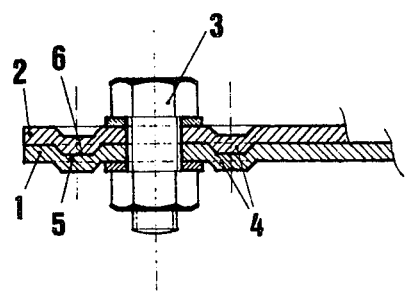
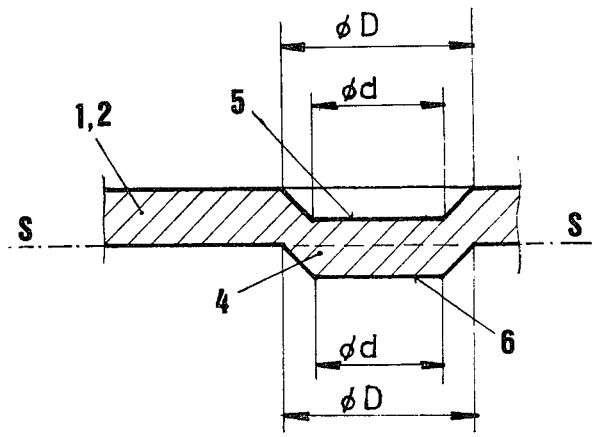
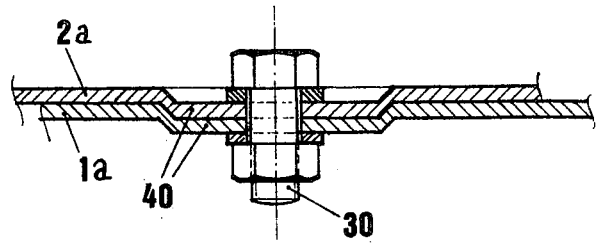

CONNECTING ARRANGEMENT

BACKGROUND OF THE INVENTION

This invention relates to a connecting arrangement, and more especially to an arrangement for connecting two or more plate-shaped elements which are disposed in overlying abutting relationship.

The invention is particularly, although not exclusively, suitable for use in connecting plate elements, such as structural plate elements of metal or synthetic plastic material; it is highly suitable for use in the erection of prefabricated structures.

Structures are now often erected from prefabricated components; thus, it is quite common to erect halls and other buildings in this manner. The supporting skeleton is supplied in form of individual elements which are taken to the building site and there connected to form the desired supporting structure. This has the advantage of being able to readily truck or otherwise transport the component parts to wherever they are required, thus saving expense.

To further simplify the erection of such prefabricated structures it is known to dispense with the need for cranes or hoists, in that construction takes place "from the ground up." According to this erection method, one end of the first (lowermost) upright element of a respective truss or arch of the supporting structure is pivotably secured to a vertical surface of a base element; the other end of the first upright element rests on the ground at this time. Subsequently, this other end is then lifted and the first upright element pivoted above the connection between its first end and the base element, until it is in requisite upright position. The connection between the first upright end and the base element is now fixed, i.e. so that the first upright element can no longer turn and is secured in position.

The next upright element is then connected in like manner to the (previously free) end of the first upright element, and this continues until the entire arch is completed. Of course, during the erection process the various upright elements, and especially the first upright element and its connections to the base element and to the second upright element, are subjected to rather high stresses because of the overall weight involved. To relieve these stresses, temporary tensor elements — e.g. wire ropes or the like — may be connected between the base element and various ones of the upright elements in order to withstand the horizontal thrust of the not yet completely assembled arch structure. Once assembly (i.e. erection) is completed, the tensor elements can, of course, be removed.

This type of assembly makes it possible to erect several or all of the arches of the supporting structure simultaneously, in order to speed the overall erection time for the building. The cladding elements are then connected to the supporting structure, insulation, doors, windows and the like provided, and the building is enclosed.

When resort is had to this type of erection operation, great importance must be placed upon the security of the connection between the elements of each arch, and also upon the interconnections of the arches with one another to form the overall supporting structure. The connections must have great strength, must be able to withstand high forces acting upon them, must be reliable to establish and assure safety of the operators. In addition, these connections must be strong and rigid enough to assure that the successive arches of the structure cannot move relative to one another out of their desired position of alignment. The requirements for safety, reliability and easy handling are made even more important by the fact that the assembly often takes places with the aid of unskilled workers.

SUMMARY OF THE INVENTION

It is a general object of the invention to overcome the disadvantages of the prior art.

More particularly, it is an object of the invention to provide a novel connecting arrangement which overcomes these disadvantages.

Another object is to provide such a connecting arrangement which is extremely well suited for the type of application described above, but which is not limited thereto by any means.

A concomitant object is to provide a connecting arrangement of the type outlined herein, which is simple to use and inexpensive to produce.

Still a further object is to provide such a connecting arrangement which is extremely strong and sturdy, and which is highly reliable in terms of safety under load.

Yet an additional object is to provide such a connecting arrangement which is capable, when used in conjunction with two elements which are in abutment with one another along a mutual interface, to absorb forces which are transmitted between these elements in the plane of this interface.

In keeping with these and other objects a connecting arrangement according to the present invention comprises, in combination, a first element having a first surface; a second element having a second surface facing and in abutment with the first surface at an interface therewith; at least one connecting member connecting the elements and retaining the first and second surfaces in mutual abutment; and matingly interfitting projections and recesses on the surfaces proximal to the connecting member and operative for resisting forces which are transmitted between the elements and which act in the plane of the interface.

The invention will now be described with reference to the appended drawing which illustrates a single embodiment. However, it should be understood that the embodiment is by way of example only and is not to be considered limiting of the invention or of the protection sought for the same.

BRIEF DESCRIPTION OF THE DRAWING

FIG. 2 is a section taken on line II—II of FIG. 1;

FIG. 3 is an enlarged-scale section showing a detail of FIG. 2; and

FIG. 4 is a sectional view, illustrating a prior-art threaded connection.

DESCRIPTION OF A PREFERRED EMBODIMENT

Figure 1:
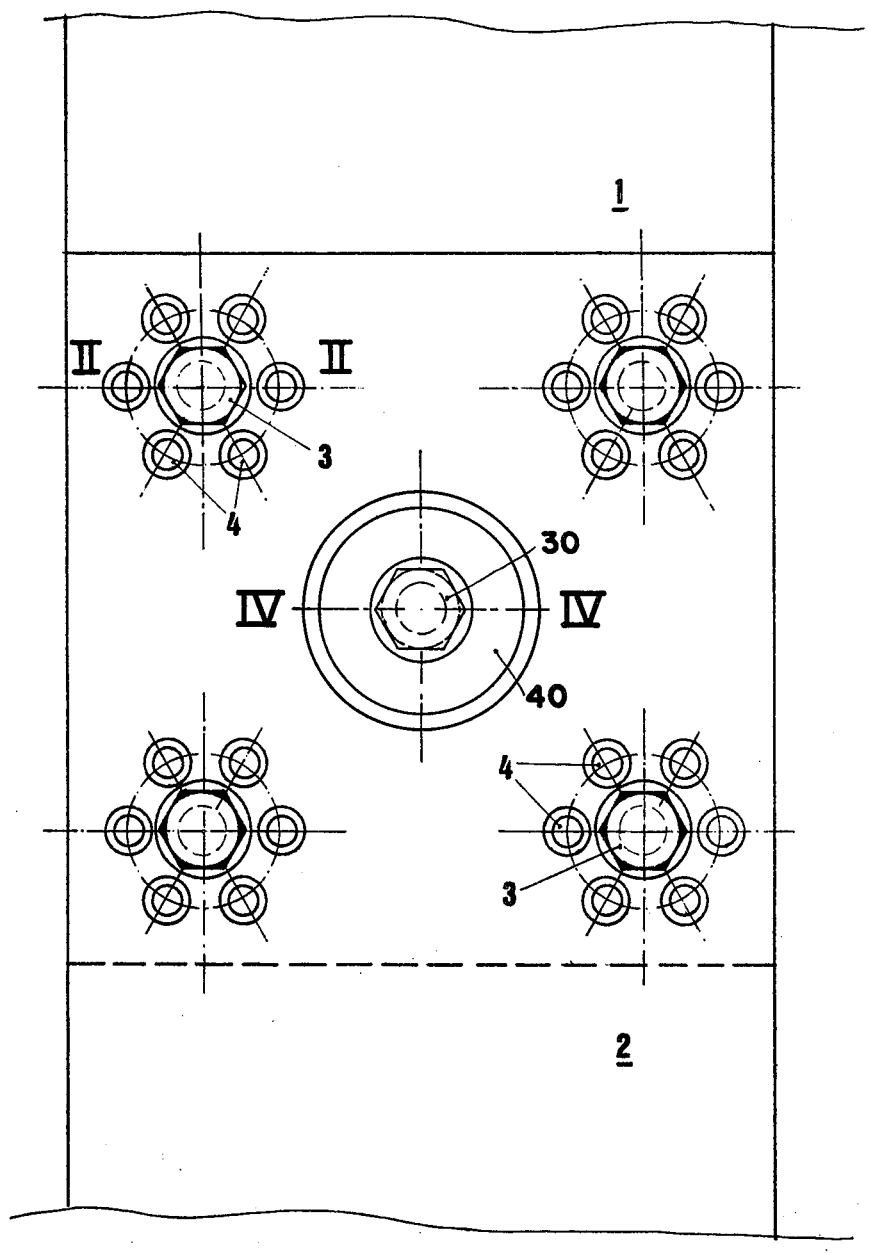
FIG. 1 is a fragmentary plan view illustrating an embodiment of the invention.

In FIGS. 1-3 the invention is illustrated in the context of a connection being established between two plate elements 1 and 2, for example two plate elements which are required to be connected together to form part of an arch which in turn forms part of the supporting structure of a prefabricated building.

The plates 1 and 2 are shown only in part, but it will be seen that they overlap one another to some extent. Where they overlap, their juxtaposed surfaces are in abutting, surface-to-surface engagement with one another (FIG. 2). In this area of overlap the plate elements 1, 2 are connected by means of a plurality of bolts 3 and their associated nuts. Five such bolts are shown, this being a frequently used number; however, it is evident that fewer or more of them might be used, just as it will be clear that in lieu of bolts it would be possible to use analogous connectors, for example rivets.

According to the invention, each of the five bolts 3 is surrounded by an annulus of matingly inter-engaging connections 4 composed of projections 6 on the element 2 and depressions or recesses 5 on the element 1. Of course, the projections could be on element 2 and the depressions on element 1, or each element could be provided with some of both of them.

The projections 6 are each firmly seated in a corresponding depression 5 when the bolts 3 are tightened. This effects a connection between the elements 1 and 2 which is totally free of play, i.e. of any possibility for relative movement of elements 1 and 2. Because of this, and because of the other factors still to be explained, the present invention assures that thrusts can be transmitted between the elements 1, 2 in the plane of their interface which are substantially larger than was heretofore possible.

As just indicated, additional factors play a role in making the connecting arrangement of the present invention so advantageous and, in particular, so able to withstand greater thrust forces acting in the plane of the element interface than is possible with conventional screw- or bolt-connections of the same diameter and the same bolt strength as used in the present invention. These factors are as follows:

1. There is the fact that the combined area of the surface portions which are in force-transmitting engagement with one another is substantially greater than the similar areas in bolt connections of the prior art.

2. The sum of the shear cross-sections of the projections and depressions 5,6, taken on the line S—S of FIG. 3, is greater than the shear cross-section of the bolt 40 alone. It is particularly important in this connection that according to an advantageous aspect of the invention the projections extend from — and the depressions extend into — the respective plate element 1, 2 only to an extent which is equal to substantially half the thickness of the plate elements 1,2. This measure maintains the full thrust cross-section of the projections having the diameter D, along the line S—S of FIG. 3, in unweakened condition — and hence able to absorb and transmit thrusts. It should be noted that if the height of the projections 6 or the depth of the depressions 5, respectively, were increased beyond the thickness of the plates 1, 2, the only effective remaining thrust cross-section along line S—S in FIG. 3 would be $F = (D^2 - d^2) \times (\pi/4)$; this would be too weak.

3. The use of HV bolts, which are also known as "high strength friction bolts," further increases the transmission of forces as compared to the use of conventional bolts of the same diameter. This is in contrast to the use of HV bolts for connecting relatively thin plate members which are not provided with the arrangement according to the present invention. In such instances, due to the relatively low stiffness and rigidity of such plate elements, there is always a loss of force transmission that must be accepted despite the ability of the HV bolts to inherently transmit higher forces. However, the use of the present invention makes it possible to fully utilize the high permissible transmission capability of HV bolts even where the bolts are used to connect relatively thin-walled plate elements to one another.

Although FIG. 1 shows each bolt 3 to be surrounded by an annulus composed of six of the connectors 4, the annulus being in this instance concentric to the associated bolt 3 and the connectors being equi-angularly (i.e. uniformly) distributed about the bolt 3, other arrangements are also possible. However, it is most advantageous if the connectors are not simply arranged proximal to the respective bolt 3, but are distributed about the bolt 3 on a geometric outline. That the number of bolts 3 and their associated connectors 4 can be varied in dependence upon the particular requirements of a given situation, will be understood without explanation.

The depressions 5 and projections 6 of the connectors 4 have been illustrated as being of essentially frusto-conical shape (compare FIGS. 2 and 3). However, other shapes are also suitable, such as half-ellipsoids, hemi-spheres or calottes. The selection of the particular shape depends to at least some extent upon the material of the plates 1,2. What counts under all circumstances, however, is that the depressions and projections be shaped and dimensioned to mate tightly, thereby assuring tight inter-engagement and full surface-to-surface contact of the walls bounding the depressions and projections as well as of the juxtaposed surfaces of the plate elements 1, 2 and of the end faces bounding the projections and depressions.

FIG. 4 illustrates a bolt connection which is known from the prior art and which is conventionally used to connect two plate elements 1a, 2a to one another. It has a bolt 30 which extends through registering bores formed in matingly shaped large depressions 40 of the plate elements 1a, 2a and onto which a cooperating nut is threaded.

The present invention, as explained above with reference to FIGS. 1–3, has the following major advantage over the prior-art connection shown in FIG. 4:

a. Producing the large-area depressions 40 in the elements 1a, 2a requires that a correspondingly large continuous area of the respective element 1a, 2a be deformed. This requires the use of correspondingly strong presses and the attendant high energy use, both factors which are not encountered with the invention.

b. Also, the accuracy of shaping, and therefore the precision of inter-engagement between the portions on elements 1a, 2a, suffers due to the fact that when large-area deformation takes place, many workpieces tend to "bounce back" partway to their previous configuration. This factor also limits the size, especially the diameter, of depressions that can be formed in certain materials with the aid of conventional deformation techniques. Furthermore, the deformation of such large continuous areas produces substantial stresses in the material; because of the shape of the forming tolls these stresses cannot readily dissipate into those areas of the plate elements which bound the newly formed depressions, and thus remain to exert disadvantageous influences upon the stress values to which the plate elements can be subjected.

These problems are all overcome by the present invention, where the connectors 4 require the deformation of a plurality of only small areas, as shown in FIG. 2. This results in a substantial reduction of the shaping forces which must be applied, making it possible to use a smaller press which requires less operating energy. Also, the stresses resulting from the deformation are much lower than those in the prior art (FIG. 4) and can more readily dissipate into the surrounding portions of the plate elements.

c. The effective surface area over which forces are transmitted is substantially smaller in the prior-art arrangement (FIG. 4) than in the arrangement of the present invention (FIGS. 2,3), given the same outer diameter of the arrangement.

d. Finally, the ratio between permissible transmission forces resulting from the shear cross-sections multiplied by the respective permissible thrust forces, and the ratio between the permissible transmission forces resulting from the permissible contact-surface areas multiplied by the respective contact-surface pressures, are much better balanced in the arrangement of the invention than in the prior art (FIG. 4), especially where the connection of relatively thin-walled plate elements is involved. This increases the economic attractiveness of the invention.

As mentioned before, the arrangement according to the present invention is especially well suited for the erection of supporting structures of buildings, e.g. halls or the like, which are composed of industrially prefabricated individual elements which are manufactured in quantity and which are to be connected and erected at the construction site. Such elements can be readily manufactured in large series by mass-production methods, and on site they can be erected to form a structure with the aid of unskilled or semi-skilled workers and without requiring elaborate technical aids, such as cranes or the like. Moreover, utilizing the invention, such erection can be carried out with great safety, at rather high speed and while maintaining rigid accuracy of the relationship between the connected elements due to the self-aligning action of the connectors 4. In particular, the invention is applicable to the erection of arches or similar parts of support structures from individual elements, in a technique in which the individual elements are simply connected together by threaded connections in order to erect the arch.

However, although particularly advantageous areas of applicability of the present invention have been outlined herein, it should be understood that the invention is not limited thereto and is, in fact, of much wider versatility.

What I desire to protect by Letters Patent of the United States is not limited to the exemplary embodiment illustrated herein, but is instead outlined in the appended claims.

I claim:

1. A structural connecting arrangement comprising
   a first structural element having a first surface, and a second surface;
   a second structural element also having a first surface and a second surface;
   at least one connecting member connecting said structural elements and retaining said first surfaces in mutual abutment at an interface while said second surfaces face away from each other;
   an annulus of discrete frustoconical projections on said first surface of said first structural element concentric to said connecting member; and
   an annulus of discrete frustoconical recesses formed in said first surface of said second element also concentric to said connecting member, the projections of said first element being matingly received in the recesses of said second element so as to resist forces which are transmitted between said elements and which are substantially in the plane of said interface.

2. A connecting arrangement as defined in claim 1, wherein said elements are plate elements.

3. A connecting arrangement as defined in claim 1, wherein said elements are plate elements and at least one thereof is of metallic material.

4. A connecting arrangement as defined in claim 1, wherein said elements are plate elements and at least one thereof is of synthetic plastic material.

5. A connecting arrangement as defined in claim 1, wherein said projections and recesses are equi-angularly spaced about said connecting member.

6. A connecting arrangement as defined in claim 1, respective first or second surface; wherein said elements are provided in the respective other surface with a corresponding depression opposite each of said projections and with a corresponding projection opposite each of said depressions, respectively.

7. A connecting arrangement as defined in claim 1, wherein said projections and depressions have a shape resembling half of an ellipsoid.

8. A connecting arrangement as defined in claim 1, wherein said projections and depressions are of hemispherical shape.

9. A connecting arrangement as defined in claim 1, wherein said projections and depressions are calotte-shaped.

10. A connecting arrangement as defined in claim 6, wherein said elements are plates, the depth of said recesses and the height of said projections each corresponding to substantially half the thickness of the respective plate, so that the thickness of the respective plate in any plane passing through a projection or recess in direction normal to said surfaces equals the thickness of the plate in the regions surrounding said projections and recesses.

11. A connecting arrangement as defined in claim 1, wherein said annuli each comprise six of said projections and recesses, respectively so as to form six force-resisting connections; and further comprising a central frustoconical projection on said first surface of said first element, and a central frustoconical recess formed in said first surface of said second element and matingly receiving said central projection so as to form with the same a central force-resisting connection spaced from said six force-resisting connections.

12. A structural element, comprising
   a structural plate having a first surface and a second surface;
   a frustoconical projection on said first surface;
   a frustoconical indentation in said second surface opposite said projection, the projection of said structural plate being adapted to be matingly received in the indentation of an adjacent similar plate so as to form therewith a force-resisting connection; and
   at least one connecting aperture located within said force-resisting connection.

13. A structural element as defined in claim 12; further comprising additional frustoconical projections and indentations spaced about the first-mentioned projection and indentation, respectively, so as to form additional force-resisting connections outwardly spaced from the first-mentioned force-resisting connection and from said connecting aperture.

14. A structural element as defined in claim 13, wherein said additional force-resisting connections comprise six each of said additional projections and additional indentations.

15. A structural element as defined in claim 13, wherein the depth of said indentations and the height of said projections is equal to less than half the thickness of said plate.

16. A building comprising
a plurality of structural plates, each of said plates having a surface in abutting engagement with a corresponding surface of another of said plates, so that the abutting surfaces form cooperating pairs of surfaces, at least one connecting member penetrating the thus abutting surfaces of each pair and retaining them in mutual abutment;
an annulus of discrete frustoconical indentations in one of said surface of each pair concentric to said connecting elements; and
an annulus of discrete mating frustoconical projections on the other of said surfaces of each pair also concentric to said connecting elements, each of said projections being matingly received in one of said indentations so as to define therewith a respective force-resisting connection which resists forces transmitted between said plates and which act substantially in the plane of an interface formed by the abutting surfaces of each pair, the depth of said indentations and the height of said projections being less than half the thickness of the respective plate.

17. A building as defined in claim 16, wherein said structural plates form a plurality of arcuate support structures.

18. A building as defined in claim 17, wherein said structural plates form a plurality of arch-shaped support structures.

19. In a method of erecting a self-supporting building from elongated arcuate structural plates each having one surface and another surface, comprising the steps of
forming an annulus of frustoconical projections in said one surface and a corresponding annulus of mating indentations in the other surface each opposite one of said projections;
forming within and spaced from said annulus a central frustoconical projection in said one surface and a mating central depression in the other surface, all of said indentations having a depth less than the thickness of the respective structural plate;
placing the respective projections of one plate into the mating indentations of an adjacent plate, so that each set composed of a respectively cooperating projection and indentation forms a force-resisting connection, whereby said plates are connected by a central force-resisting connection which is surrounded by an annulus of outer force-resisting connections; and
securing said plates together against movement away from each other.

20. A method as defined in claim 19, wherein the step of securing comprises passing a connecting element through said plates within said central force-resisting connection.

21. A structural plate element having formed thereon an aperture;
an annular indentation spaced from said aperture and surrounding the same; and
additional frustoconical indentations placed around said annular indentation;
said structural plate element being adapted to be secured to another similar structural plate element by matingly placing said indentations and said apertures of said plate elements over each other to form a force-resisting connection between said structural plate elements and for placing a connecting element in said mating apertures.

22. A structural plate element as defined in claim 21, wherein said annular indentation is frusto-conical in cross-section.

23. A structural plate element as defined in claim 21, wherein said indentations approach, but do not exceed, the half thickness of said structural element.

24. A structural plate element as defined in claim 21, wherein said additional indentations are located in a circle surrounding said annular indentation.

25. A structural plate element as defined in claim 21, wherein said additional indentations are six in number and surround said circular indentation.

* * * * *